United States Patent
Brimeyer (10) Patent No.: US 10,264,728 B2
(45) Date of Patent: Apr. 23, 2019

(54) HARVESTER HEAD DRAPER BELT TRACKING

(71) Applicant: Deere and Company, Moline, IL (US)

(72) Inventor: Alex A. Brimeyer, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/626,063

(22) Filed: Jun. 16, 2017

(65) Prior Publication Data
US 2018/0359921 A1    Dec. 20, 2018

(51) Int. Cl.
*A01D 61/02* (2006.01)
*A01D 57/12* (2006.01)

(52) U.S. Cl.
CPC .............. *A01D 61/02* (2013.01); *A01D 57/12* (2013.01)

(58) Field of Classification Search
CPC ...... A10D 57/20; A10D 61/002; A10D 41/14; A10D 61/06; A10D 61/006; A10D 57/06; A10D 61/02; A10D 57/12; A01F 15/18; B65G 15/64; B65G 21/22; B65G 23/04; B65G 39/071; B65G 39/16
See application file for complete search history.

(56) References Cited

U.S. PATENT DOCUMENTS

| | | | | |
|---|---|---|---|---|
| 3,058,574 A * | 10/1962 | Gianukos | ............... | B65G 39/16 198/806 |
| 3,368,665 A * | 2/1968 | Jinkins | .................... | B65G 39/16 198/806 |
| 3,593,841 A * | 7/1971 | Leow | ...................... | B65G 39/16 198/806 |
| 3,710,927 A * | 1/1973 | Alsted | ..................... | B65G 39/16 198/807 |
| 4,038,809 A | 8/1977 | Arnould et al. | | |
| 4,421,228 A | 12/1983 | Marsiglio | | |
| 6,116,410 A * | 9/2000 | Malmberg | ............. | B65G 39/16 198/806 |
| 6,431,348 B2 * | 8/2002 | Malmberg | ............. | B65G 39/16 198/806 |
| 8,272,199 B2 * | 9/2012 | Sauerwein | ............. | A01D 57/20 56/181 |
| 8,281,561 B2 * | 10/2012 | Dow | ....................... | A01D 57/20 56/181 |
| 8,495,855 B1 * | 7/2013 | Conrad | ................ | A01D 61/002 56/16.4 R |

(Continued)

FOREIGN PATENT DOCUMENTS

| | | |
|---|---|---|
| AT | 255328 | 6/1967 |
| CA | 2904464 | 3/2016 |
| WO | WO2012045622 | 4/2012 |

*Primary Examiner* — Arpad Fabian-Kovacs
(74) *Attorney, Agent, or Firm* — Rathe Lindenbaum LLP (57) ABSTRACT

A harvester head may include a frame, a roller configured to support a draper belt and at least one tracking correction arm. The roller has a rotational axis and is pivotably supported by the frame about at least one pivot axis non-parallel to the rotational axis. The at least one tracking correction arm is coupled to the roller and may include a first belt bump stop and a second belt bump stop. The first and second belt bump stops contact portions of the draper belt such that mistracking of the draper belt relative to the roller pivots the roller about the pivot axis until the draper belt is automatically moved back into a tracking relationship with the roller.

19 Claims, 6 Drawing Sheets

(56) References Cited

U.S. PATENT DOCUMENTS

| | | | |
|---|---|---|---|
| 8,573,388 B2* | 11/2013 | Hoffman | A01D 41/14 198/814 |
| 2005/0022491 A1* | 2/2005 | Zurn | A01D 57/20 56/16.4 R |
| 2008/0073182 A1* | 3/2008 | Dowling | B65G 39/16 198/806 |
| 2008/0092508 A1* | 4/2008 | Talbot | A01D 57/20 56/181 |
| 2009/0308042 A1* | 12/2009 | Lovett | A01D 57/20 56/153 |
| 2010/0006402 A1* | 1/2010 | Sharp | B65G 39/16 198/806 |
| 2010/0011729 A1 | 1/2010 | Salley et al. | |
| 2010/0116626 A1* | 5/2010 | Felton | B65G 39/09 198/806 |
| 2011/0272250 A1* | 11/2011 | DeVries | B65G 39/16 198/617 |
| 2012/0152698 A1* | 6/2012 | Viaud | A01F 15/18 198/806 |
| 2012/0233974 A1* | 9/2012 | Cormier | A01D 57/20 56/181 |
| 2013/0075235 A1* | 3/2013 | Maiwald | B65G 39/16 198/806 |
| 2013/0233680 A1* | 9/2013 | Sharp | B65G 15/60 198/806 |
| 2013/0284565 A1* | 10/2013 | Kuiper | B65G 15/64 198/617 |
| 2014/0196427 A1 | 7/2014 | Fuechtling | |
| 2015/0166264 A1* | 6/2015 | Ballou | B65G 15/64 198/806 |
| 2018/0079597 A1* | 3/2018 | Mott | B65G 15/08 |

\* cited by examiner

HARVESTER HEAD DRAPER BELT TRACKING

BACKGROUND

Draper belts are used on harvester heads to convey severed crop material transversely across the head to a feeder housing that further conveys the crop material into the harvester for handling, such as threshing and cleaning. During operation, the draper belts may mis-track, become misaligned with their supporting rollers or drive mechanisms, potentially damaging the draper belt or other components of the harvester head.

DETAILED DESCRIPTION OF EXAMPLES

Disclosed herein are example harvester heads that facilitate automatic correction of mistracked draper belts. The example harvester heads pivotably support at least one of the roller supporting the draper belt while operably coupling the pivotable roller to surfaces of the draper belt such that the forces of a mistracking draper belt are used to walk back or return the draper belt to an aligned position or state. As a result, potential damage to the harvester head resulting from a mistracked draper belt is reduced, prolonging the life of the belt and the harvester head.

Disclosed herein is an example harvester head that may include a frame, a roller configured to support a draper belt and at least one tracking correction arm. The roller has a rotational axis and is pivotably supported by the frame about at least one pivot axis nonparallel to the rotational axis. The at least one tracking correction arm is coupled to the roller and may include a first belt bump stop and a second belt bump stop. The first and second belt bump stops contact portions of the draper belt such that mistracking of the draper belt relative to the roller pivots the roller about the pivot axis until the draper belt is automatically moved back into a tracking relationship with the roller.

Disclosed herein is an example harvester head that may include a draper belt, a first roller supporting a first end of the draper belt at least one first tracking correction arm, a second roller supporting a second end of the draper belt and at least one second tracking correction arm. The first roller has a first rotational axis and is pivotably supported by the frame about a first pivot axis nonparallel to the first rotational axis. The at least one first tracking correction arm is coupled to the roller and comprises a first belt bump stop to contact a first portion of the draper belt and a second belt bump stop to contact a second portion of the draper belt such that mistracking of the draper belt relative to the roller pivots the roller about the pivot axis until the first end of the draper belt is automatically moved back into a tracking relationship with the roller. The second roller has a second rotational axis and is pivotably supported by the frame about a second pivot axis nonparallel to the second rotational axis. The second roller is translatable relative to the first roller to adjust a tension of the draper belt. The at least one second tracking correction arm is coupled to the second roller and comprises a third belt bump stop to contact a third portion of the draper belt and a fourth belt bump stop to contact a fourth portion of the draper belt such that mistracking of the draper belt relative to the second roller pivots the second roller about the second pivot axis until the second end of the draper belt is automatically moved back into a tracking relationship with the second roller.

Disclosed herein is an example method for auto correcting a mistracking draper belt of a harvester head. The method may include the steps of wrapping a draper belt about a roller having a rotational axis, pivoting the roller in a first direction about a pivot axis nonparallel to the rotational axis in response to a mistracking draper belt that is mistracking relative to the roller and using force of the mistracking draper belt to pivot the roller in a second direction, opposite the first direction, and automatically move the draper belt back towards tracking with the roller.

Figure 1:
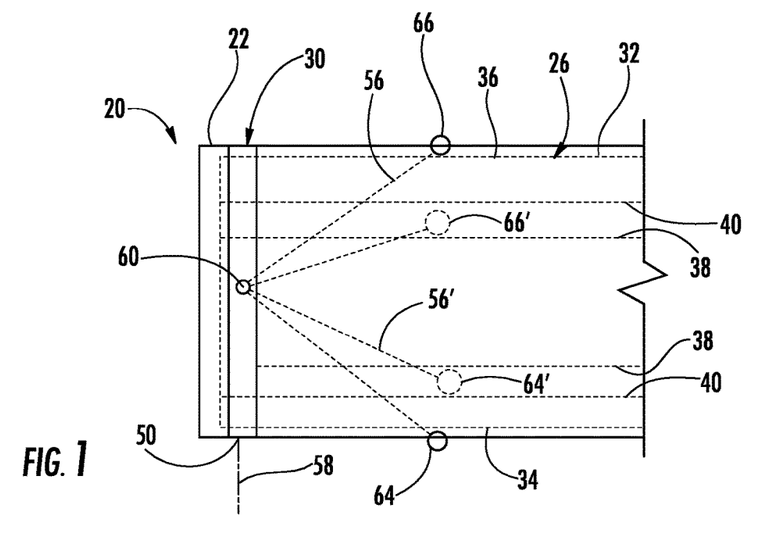
FIG. 1 is a top view schematically illustrating portions of one end of an example harvester head.
Figure 2:
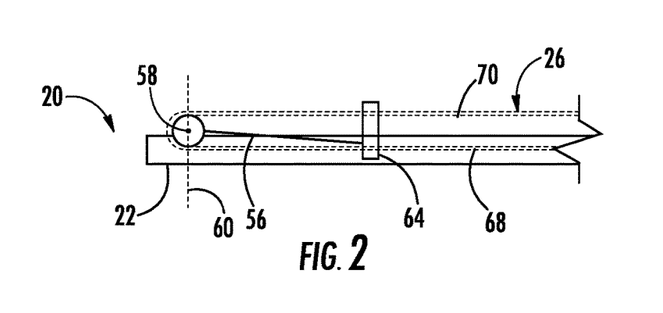
FIG. 2 is an end view of the portions of the example harvester head of FIG. 1.

FIGS. 1 and 2 schematically illustrate portions of an example harvester head 20 that provides for automatic, self-correction of a mistracked draper belt. FIGS. 1 and 2 illustrate one side of a draper belt supporting arrangement of a harvester head. It should be appreciated that the opposite side of the draper belt supporting arrangement may mirror the arrangement shown in FIGS. 1 and 2. Harvester head 20 utilizes the forces created from a mistracked draper belt to pivot a supporting roller so as to create force moments that walk back the draper belt towards its original aligned, tracked state with respect to the roller. For purposes of this disclosure, the term "roller" encompasses a single elongate member rotatable about a rotational axis or a plurality of adjacent or spaced members rotatable about a rotational axis or rotatable by about multiple offset rotational axes, and about which the draper belt winds or is wrapped. The term "roller" encompasses such a rotatable member or members that have projections, such as teeth, or recesses that facilitate engagement with the driver belt to drive the draper belt or such rotatable member or members lacking such belt driving structures.

Harvester head 20 comprises frame 22, draper belt 26 and belt supporting and correction system 30. Frame 22 (schematically illustrated) comprises an assembly of brackets, plates, rods, bars or other structures that serve as a base, platform or foundation for harvester head 20. In one implementation, frame 22 comprises an interface for releasably mounting our connecting harvester head 20 to the feeder house or other structure of a harvester. In another implementation, frame 22 is fixedly or permanently provided as part of a harvester, such as a combine. Although illustrated as supporting draper belt 26 and belt supporting correction system 30, it should be appreciated that frame 22 may support additional structures of harvester head 20, including but not limited to, a cutter bars, reels and augers.

Draper belt 26 comprises a belt supported by belt supporting and correction system 30. In one implementation, draper belt 26 comprises a continuous endless belt. In another implementation, belt 26 comprises a seamed belt having ends welded, bonded, fastened or otherwise secured to one another. Draper belt 26 comprises a web 32 which comprises an elongate expansive material having sufficient flexibility so as to wrap about a roller of system 30. Web 32 has outermost edges 34, 36 that extend along a length of web 32. In the example illustrated, edges 32 interact with belt supporting and correction system 30.

In some implementations, draper belt 26 may additionally or alternatively comprise other surfaces along its length that interact with system 30. For example, as shown by broken lines, in some implementations, draper belt 26 may comprise surfaces 38 and/or surfaces 40 that interact with system 30. Surfaces 38 and 40 extend along the underside or inside, mutually facing surfaces of the continuous loop formed by web 36. Surfaces 38 and 40 face in directions parallel to a rotational axis of the roller supporting web 26. In one implementation, surfaces 38 and 40 comprise surfaces that are perpendicular to the generally flat plane containing a majority of the outermost surface of the expanse of web 32 extending between a pair of space supporting rollers. In one implementation, draper belt 26 comprises both surfaces 38 and 40, wherein adjacent pairs of surfaces 38, 40 form a belt alignment feature, such as a V-groove, that receives and tracks on a circumferential protuberance, ring or tooth on one or both of the draper belt supporting rollers.

In some implementations, draper belt 26 may additionally comprise a textured surface on its exterior surface (outside surface of the continuous loop formed by web 36) that engages and carries grain or other crop as draper belt 26 is driven about the pear space supporting rollers. For example, in one implementation, drip belt 26 may comprise cleats that extend between edges 34, 36, in directions perpendicular to edges 34, 36. In other implementations, such cleats or textured surface may be omitted.

In one implementation, harvester head 20 comprises a pair of draper belts 26 that extend on opposite sides of a feeder house of the harvester and which are driven in opposite directions so as to convey crop toward the center point between the pair of draper belts 26. In another implementation, harvester head 20 may comprise multiple draper belts on each side of a feeder house of the harvester. Because draper belt 26 extends and is driven in directions transverse and perpendicular to the forward and rearward movement of the harvester during harvesting, draper belt 26 may be more susceptible to forward and rearward mistracking.

Belt supporting and correction system 30 supports draper belt 26 and automatically retracks or realigns a mistracked draper belt 26. Although one end of draper belt 26 is illustrated as being supported and guided by system 30, it should be appreciated that the other end of belt 26 may likewise be supported and guided by a second system 30, mirroring the system 30 that is shown. System 30 comprises roller 50 and tracking correction arm 56. Roller 50 is coupled to frame 22 so as to be rotatable about a rotational axis 58. Roller 50 rotates about rotational axis 58 as draper belt 26 is driven about the two spaced supporting rollers, one of which comprises roller 50.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Roller 50 is additionally pivotably supported by the frame for pivotal movement about pivot axis 60. Pivot axis 60 extends nonparallel to rotational axis 58. In one implementation, pivot axis 60 extends perpendicular to pivot axis 58. Although pivot axis 60 is illustrated as intersecting rotational axis 58, in other implementations, pivot axis 60 may be offset from rotational axis 58. For example, in one implementation, roller 50 may be rotatably supported about rotational axis 58 by a bracket or bar, wherein pivot axis 60 extends through the bracket or bar rotationally supporting roller 50.

Pivot axis 60 may be formed by a variety of mechanical arrangements or mechanisms. For example, in one implementation, pivot axis 60 may be formed by a bore or bushing coupled to one of frame 22 and roller 50 that receives a shaft or pin coupled to the other of frame 22 and roller 50. In another implementation, the length of roller 50 may be supported so as to float such that opposite axial end portions of roller 50 may be moved (left and right as seen in FIG. 1) by different extents. For example, in one implementation, opposite end portions of roller 50 may be biased by separate compression or tension springs, wherein different compression or extension of such springs at the opposite ends results in roller 50 pivoting about pivot axis 60.

Tracking correction arm 56 is coupled to roller 50 and interacts with draper belt 26 so as to transmit forces resulting from movement up draper belt in directions forwardly or rearwardly along rotational axis 58 so as to pivot roller 50 about pivot axis 60. In one implementation, tracking correction arm 56 comprises a single continuous U or V shaped arm operably coupled to roller 50 to transmit forces of a misaligned draper belt 26 to roller 50. In another implementation, tracking correction arm 56 comprises multiple tracking correction arms, each arm having a first portion interacting with draper belt 26 and a second portion coupled to roller 50. As should be appreciated, arm 56 may be formed from a single integral structure or from multiple separate components welded, fastened or otherwise joined to one another.

Tracking correction arm 56 comprises belt bump stops 64, 66 which interact with and contact edges 34 and 36 of web 32 of draper belt 26, respectively. In one implementation, stops 64, 66 bare against the edges 34, 36 of the lower span 68 of web 36. In another implementation, stops 64, 66 bare against the edges 34, 36 of the upper span 70 of web 36. In one implementation, stops 64 and 66 concurrently bare against edges 34, 36 of both the lower span 68 in the upper span 70 of web 36 as shown in FIG. 2. As shown in broken lines in FIG. 1, system 30 may alternatively comprise tracking correction arm 56'comprising stops 64' and 66' that interact with surfaces other than the rearward most and forward most edges of belt 26, such as surfaces 38 and/or 40.

Figure 3:
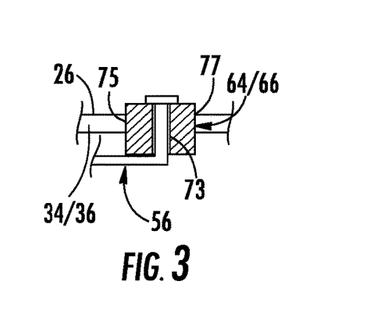
FIG. 3 is a fragmentary sectional view of a portion of the example harvester head of FIG. 2.

In one implementation, stops 64, 66 are rigid and fixed, sliding along edges 34 and 36 as draper belt 26 is driven. In yet another implementation, stops 64, 66 have outer surfaces that are rotatable, allowing stops 64, 66 to roll along edges 34 and 36 as draper belt 26 is driven. For example, as shown in FIG. 3, in one implementation, at least one of stops 64, 66 may comprise a vertically oriented shaft 73 about which a hollow tubular or cylindrical bushing 75 rotates as the outer surface 77 of the bushing 75 bares against the corresponding opposite edge 34, 36 of draper belt 26.

As shown by broken lines, in some implementations, tracking correction arm 56 may interact with draper belt 26 at locations other than edges 34 and 36. For example, tracking correction arm 56 may alternatively interact with surfaces 38, surfaces 40 or at least one pair or set of both of surfaces 38 and 40 which are on the inside of the loop of belt 26. In some implementations, arm 56 may alternatively interact with surfaces similar to surfaces 38 and 40 that extend on the outside of the continuous loop formed by belt 26.

Figure 4:
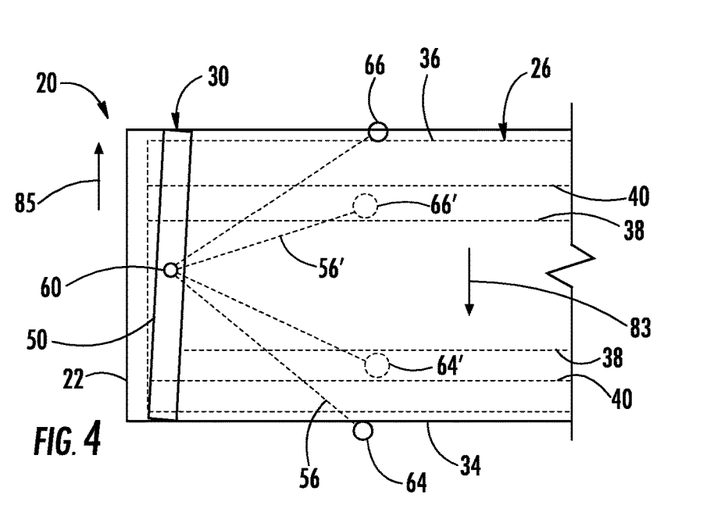
FIG. 4 is a top view schematically illustrating portions of one end of another example harvester head.

FIG. 4 illustrates an example response of belt supporting correction system 30 to a mistracking of draper belt 26 relative to roller 50. In the example mistracking scenario depicted in FIG. 4, belt 26 has mistracked in the forward direction indicated by arrow 83. As a result, edge 34 of belt 26 exerts a forward force on stops 64 of arm 56. This creates a moment, results in roller 50 pivoting in a clockwise direction about pivot axis 60 to the orientation shown in FIG. 4. This creates a difference in belt tension along the length of roller 50. The belt tracks to the side of low tension, so this automatically corrects for the mistracking by using the force of the mistracked belt 26 to "walk back" draper belt 26 by causing draper belt 26 to slide or move along roller 50 relative to roller 50 in the direction indicated by arrow 85 to the "toe-in" side, pivoting roller 50 back about axis 60 in a counter-clockwise direction to or towards the original aligned, tracked state shown in FIG. 1.

Figure 5:
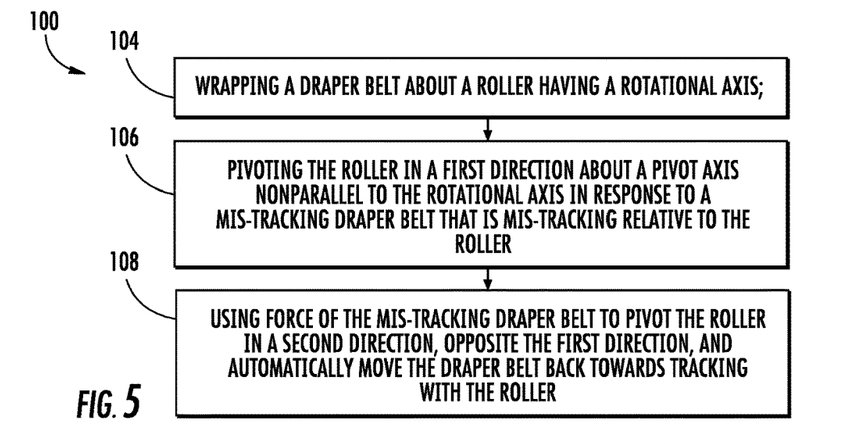
FIG. 5 is a flow diagram of an example method for automatically responding to and addressing mistracking of a draper belt.

FIG. 5 is a flow diagram of an example method 100 for automatically re-tracking or realigning a mistracked draper belt of a harvester head. Method 100 involves the use of forces of the mistracked draper belt to automatically, and without user intervention, realign the draper belt during operation. Although method 100 is described in the context of harvester head 20, it should be appreciated that method 100 may be carried out with any of the example harvester heads described hereafter as well as other similarly configured harvester heads.

As indicated by block 104, draper belt 26 is wrapped about a roller, such as roller 50, having a rotational axis 58. As indicated by block 106, roller 50 is pivoted in a first direction about a pivot axis 60 that is nonparallel to the rotational axis 58 in response to a missed tracking of the draper belt 26 that is mistracking relative to roller 50. In the example illustrated in FIG. 4, roller 50 pivots in a clockwise direction in response to forward mistracking of draper belt 26 in the direction indicated by arrow 83. Alternatively, roller 50 may pivot in a counterclockwise direction in response to a rearward mistracking of draper belt 26 in a direction opposite to that of arrow 83.

As indicated by block 108, the force of the mistracked draper belt is used to pivot the roller in a second direction, opposite the first direction, and automatically move the draper belt back towards tracking with the roller 50. In particular, the pivoting of roller 50 in block 106 places those portions of belt 26 wrapping about roller in an uneven or non-uniform state of tension along roller 50. In the example mistracking scenario shown in 4, the lower portion of belt 26, is in a higher state of tension as compared to the upper portion of belt 26. This results in sliding or otherwise moving of draper belt 26 in an upward direction to even out the level of tension of belt 26 along roller 50, once again pivoting roller 50 about pivot axis 60 and realigning belt 26 with roller 50. The same general mechanics would occur in response to belt 26 mistracking in a rearward direction, opposite to the direction indicated by arrow 83 in FIG. 4.

Figure 6:
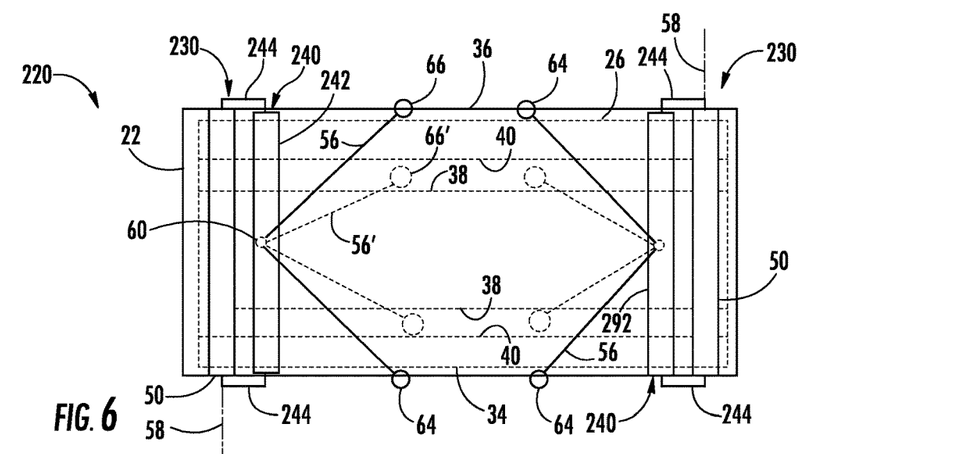
FIG. 6 is a top view schematically illustrating portions of another example harvester head.

FIG. 6 schematically illustrates portions of another example harvester head 220. Harvester head 220 is similar to harvester head 20 described above except that harvester head 220 is illustrated as comprising a pair of belt supporting and correction systems 230 at opposite end portions of draper belt 26. Each of systems 230 is similar to system 30 described above except that each of systems 230 rotationally support roller 50 about a rotational axis 58 with a roller support 240 which is pivotable about pivot axis 60 offset from rotational axis 58.

In one implementation, roller support 240 comprises a support or load bar 242 and a pair of opposite castings 244. Load bar 242 is pivotable about axis 60 relative to frame 22. In one implementation, pivot axis 60 is formed by a pin coupled to one of load bar 242 and frame 22 received within a bushing or bore coupled to the other of load bar 242 and frame 22. In one implementation, the bore may comprise a slot. In one implementation, opposite ends of load bar 242 rest upon an underlying shoulder surface or platform of frame 22 and are provided with sufficient clearance so as to permit pivoting of load bar 242 about pivot axis 60 with load bar 242 sliding along the underlying shoulder surface or platform of frame 22. Castings 244 are supported by load bar 242 and rotationally support roller 50 at opposite ends of roller 50 such that pivoting of load bar 242 also results in pivoting of roller 50 about pivot axis 60. Each of systems 230 automatically response to a mistracking of belt 26 in the same fashion as described above respect to FIG. 4 or method 100.

Figure 7:
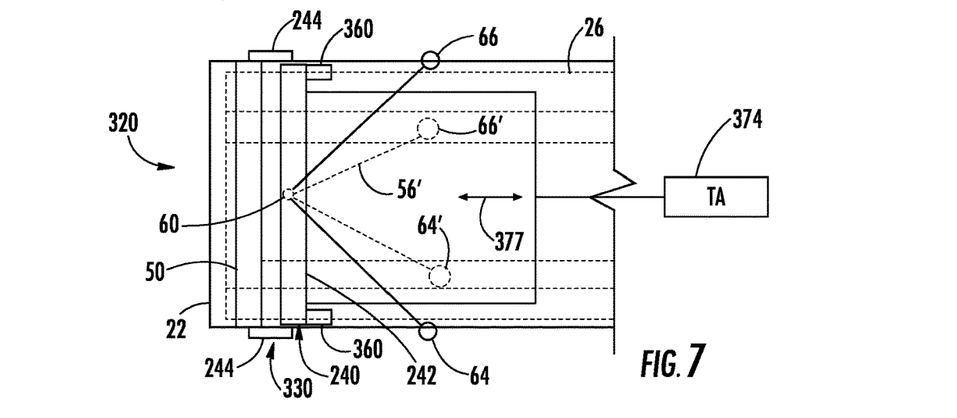
FIG. 7 is a top view schematically illustrating portions of one end of another example harvester head.

FIG. 7 schematically illustrates portions of another example harvester head 320. As with harvester heads 20 and 220 described above, harvester head 320 uses forces of a mistracked draper belt to automatically, and without user intervention, realign the draper belt 26 during operation. Harvester head 320 similar to harvester head 220 described above except that harvester head 320 comprises belt supporting and correction system 330 on at least one end of draper belt. The remaining components of harvester head 320 which correspond to components of harvester head 220 or harvester head 20 are numbered similarly.

Belt supporting and correction system 330 is similar to belt supporting correction system 230 described above except that belt supporting correction system 330 comprises springs 360 and tension adjuster 374. Those remaining components of system 330 which correspond to system 230 are numbered similarly. Springs 360 are captured between portions of frame 22 and load bar 242. Springs 360 exert forces on opposite ends of load bar 242 to bias load bar 242 towards an orientation in which the rotational axis 58 of the supported roller 50 extends substantially perpendicular to the length of draper belt 26. At the same time, springs 360 are configured so as to be non-uniformly or differently compressed (as in the case of springs 360 each comprising a compression spring or leaf spring) or extended (as in the case of spring 360 each comprising a tension spring), allowing load bar 242 and the supported roller 50 to pivot about at least one pivot axis, such as pivot axis 60. As described above, in one implementation, load bar 242 rests upon an underlying platform or shoulder surface, allowing load bar 242 to slide along the platform when being translated or pivoted.

Tension adjuster 374 comprises a mechanism operably coupled to load bar 242 and/or roller 50 so as to selectively translate roller 50 in either of the directions indicated by arrows 377 to selectively adjust a tensioning of belt 26. In the example illustrated, tension adjuster 374 equally or uniformly moves load bar 242 in the direction indicated by arrows 377 such that load bar 248 does not pivot about pivot axis 60, but translates to the left or to the right. In one implementation, tension adjuster 374 comprises a threaded shaft extending along an axis parallel to arrows 377 and threadably engaging a corresponding threaded structure coupled to load bar 242 such that rotation of the threaded shaft axially moves load bar 242 and it supported roller 50. In other implementations, tension adjuster 374 may comprise a hydraulic or pneumatic cylinder-piston assembly, an electric solenoid or other linear actuators for translating load bar 242 and roller 50.

Figure 8:
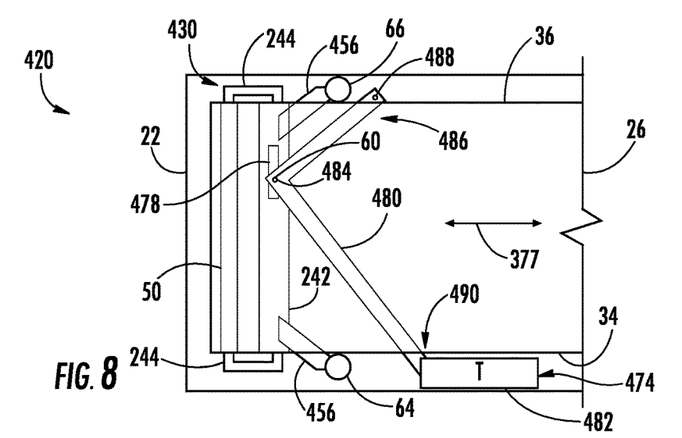
FIG. 8 is a top view schematically illustrating portions of one end of another example harvester head.

FIG. 8 schematically illustrates portions of another example harvester head 420. Although FIG. 8 illustrates one end of draper belt 26, should be appreciated that the other end of 26 may be supported by a similar mirroring arrangement as that shown or maybe supported by a system similar to that shown in FIG. 1 or 6. Harvester head 420 is similar to harvester head 320 described above except that harvester head 420 is specifically illustrated as comprising belt supporting and correction system 430 in place of system 330.

Belt supporting and correction system 430 is similar to system 330 except the system 430 is specifically illustrated as comprising tracking correction arms 456 and as specifically comprising tension adjuster 474. Tracking correction arms 456 extend from load bar 242 and comprise belt bump stops 64, 66 (described above) which bare against edges 34, 36, respectively. As described above, in other implementations, arms 456 and stops 64, 66 may alternatively be configured to bare against other surfaces, such as an implementation where belt 26 is provided with surfaces 38 and/or surface 40 as described above with respect to FIG. 1.

Tension adjuster 474 adjusts the tension of draper belt 26. Tension adjuster 474 translates load bar 242 and the supported roller 50 in either of the directions indicated by arrows 377. Tension adjuster 474 facilitates such translation and tension adjustment while the same time allowing load bar 242 and roller 50 to pivot about a pivot axis 60 to provide auto correction of a mistracking draper belt 26. Tension adjuster 474 comprises slot 478, tensioning arm 480 and translator 482.

Slot 478 extends into load bar 242. In one implementation, slot 478 extends completely through load bar 242. In another implementation, slot 478 extends partially into load bar 242, having a floor. Slot 478 receives a protuberance or pin 484 projecting from tensioning arm 480. Pin 484 is slidably received within slot 478 and provides pivot axis 60. Pin 484 translates within slot 478 during translation of load bar 242 and roller 50 during tension adjustment of draper belt 26. Although slot 478 is illustrated as being rectangular, in other implementation, slot 478 may have other shapes.

Tensioning arm 480 comprises a structure that supports pin 484 within slot 478. Arm 480h as a first end 486 pivotably coupled to frame 22 about a pivot axis 488 and a second end 490 pivotally coupled to translator 482 such that end 490 may be linearly translated by translator 482. Arm 480 has a shape such that translation of end 490 in either the directions indicated by arrows 377 moves pin 484 along an arc with pin 484 sliding within slot 478 as load bar 242 and roller 50 translate in either of the directions indicated by arrows 372 to adjust a tensioning of draper belt 26. In the example illustrated, tensioning arm 480 has a V-shape. In other implementations, arm 480 may have other shapes.

Translator 482 comprise a device to linearly translate end 490 selectively in one of the directions indicated by arrows 377. In one implementation, translator 482 comprises a threaded shaft extending along an axis parallel to arrows 377 and threadably engaging a corresponding threaded structure coupled to load bar 242 such that rotation of the threaded shaft axially moves load bar 242 and its supported roller 50. In other implementations, tension adjuster 374 may comprise a hydraulic or pneumatic cylinder-piston assembly, an electric solenoid or other linear actuators for translating end 290 of tensioning arm 480 so as to translate load bar 242 and roller 50 for tension adjustment of draper belt 26.

Figure 9:
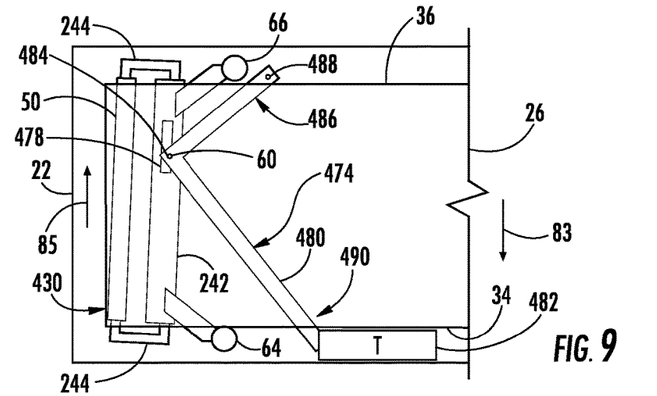
FIG. 9 is a top perspective view of the portions of the harvester head of FIG. 8 responding to mistracking of a draper belt in a first direction.
Figure 10:
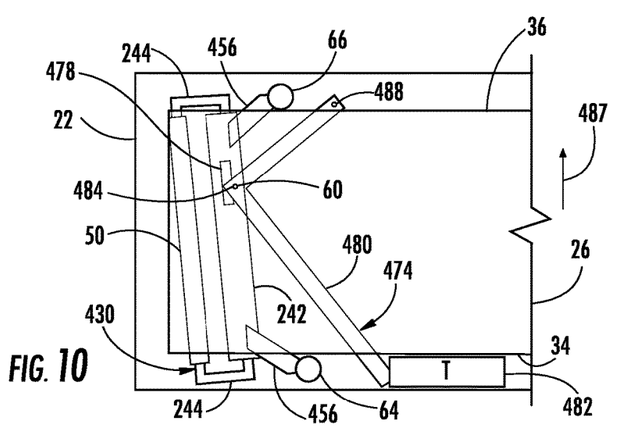
FIG. 10 is a top perspective view of the portions of the harvester head of FIG. 8 when responding to mistracking of the draper belt in a second direction.

FIGS. 9 and 10 illustrate the automatic correction of a mistracking draper belt 26 by system 430. In the example mistracking scenario depicted in FIG. 9, draper belt 26 has mistracked in the forward direction indicated by arrow 83. As a result, edge 34 of belt 26 exerts a forward force on stop 64 of arm 456. This causes a moment and results in load bar 242 and roller 50 pivoting in a clockwise direction about pivot axis 60 to the orientation shown in FIG. 9. Belts track to the side with lower tension. The differences in belt tension along the length of roller 50 automatically corrects for the mistracking. The tension difference "walks back" the draper belt 26 by causing draper belt 26 to slide or move along roller 50 relative to roller 50 in the direction indicated by arrow 85 to the "toe-in" side, pivoting roller 50 back about axis 60 in a counter-clockwise direction to or towards the original aligned, tracked state shown in FIG. 8.

In the example mistracking scenario depicted in FIG. 10, draper belt 26 has mistracked in the rearward direction indicated by arrow 487. As a result, edge 36 of belt 26 exerts a rearward force on stop 66 of arm 456. This causes a moment and results in load bar 242 and roller 50 pivoting in a counterclockwise direction about pivot axis 60 to the orientation shown in FIG. 10. Belts track to the side of lower tension. The differences in belt tension along the length of roller 50 automatically corrects for the mistracking. The tension difference "walks back" the draper belt 26 by causing draper belt 26 to slide or move along roller 50 relative to roller 50 in the direction indicated by arrow 489 to the "toe-in" side, pivoting roller 50 back about axis 60 in a clockwise direction to or towards the original aligned, tracked state shown in FIG. 8.

Figure 11:
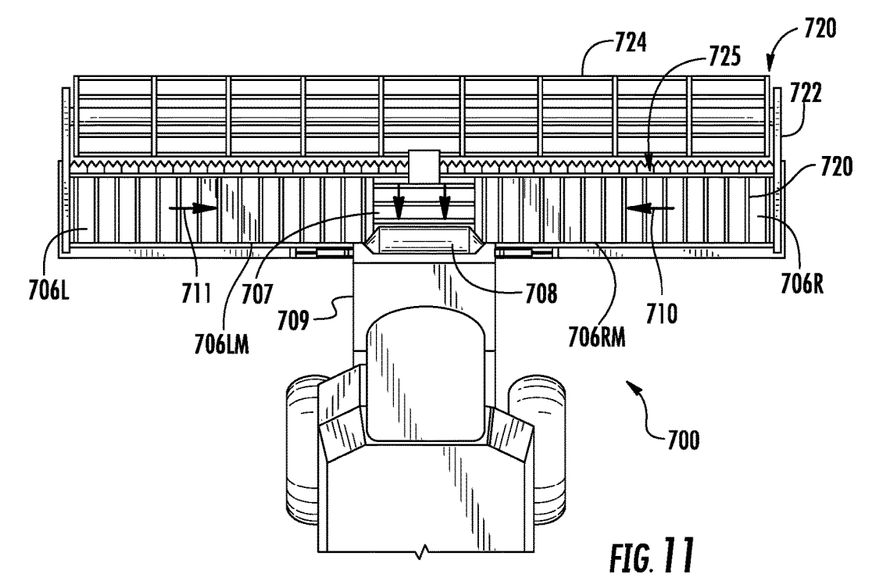
FIG. 11 is a top view of an example harvester having another example harvester head.

FIG. 11 is a top view of a portion of an example harvester 700 comprising an example harvester head 720. The example header 720 generally comprises frame 722, gathering reels 724, cutter assembly 725, draper belt assemblies 706L, 706LM, 706RM and 706R (collectively referred to as draper belt assemblies 706), central draper belt 707 and feed drum 708. Frame 722 forms the exterior of header 720 and supports remaining components of header 720. Frame 722 is configured to be releasably mounted to combine harvester 700.

Gathering reels 724 gather and direct the crop towards cutter assembly 725. Cutter assembly 725 cuts and are severs the crop or plant from soil. Draper belt assemblies 706 comprise carpets, platforms or belts which are transversely driven so as to carry the severed plants or crops to central draper 707. Draper belt assembly 706R and draper belt assembly 706 RM carry the severed crops in the direction indicated by arrow 710 to central draper belt 707. Draper belt assembly 706L and draper belt assembly 706 LM carry the severed crops in the direction indicated by arrow 711 to central draper belt 707. Central draper belt 707 conveys the severed crop material to feed drum 708. Feed drum 708 is rotatably driven so as to move the severed crop material rearwardly into a feeder house 709 of harvester 701 for threshing.

Figure 12:
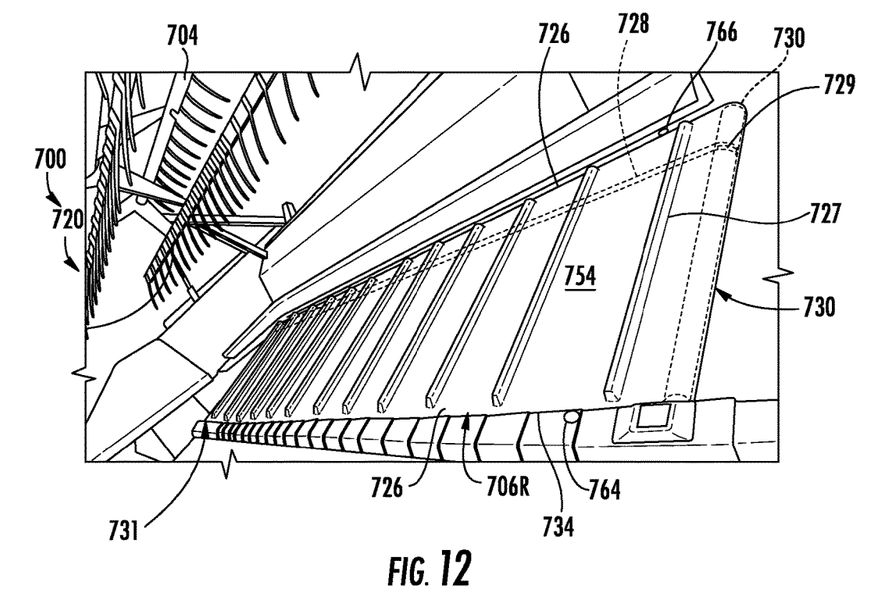
FIG. 12 is a fragmentary perspective view of portions of the example harvester head of the harvester of FIG. 11.

FIG. 12 is an enlarged fragmentary view of a portion of header 720, illustrating one of draper belt assemblies 706R. Draper belt assembly 706R is similar to each of the remaining draper belt assemblies 706. Draper belt assembly 706R comprises draper belt 726 and a pair of opposite belt supporting and correction systems 730, 731 that support opposite ends of belt 726. In the example illustrated, system 730 supports a drive roller 750 while system 731 supports an idler roller. As shown by FIG. 12, in the example illustrated, draper belt 726 comprises a plurality of spaced cleats 727 along the exterior of the looped belt 726. In the example illustrated, the interior surfaces of belt 726 further comprise an elongated protuberance or rib 728 that tracks within a corresponding annular groove 729 that circumscribes the rollers of each of systems 730 and 731. In other implementations, such cleats 727 may have different configurations. Moreover, in some implementations, a pair of such ribs 728 and grooves 729 may be used for tracking. In yet other implementations, rib 728 and groove 729 may be omitted.

Figure 13:
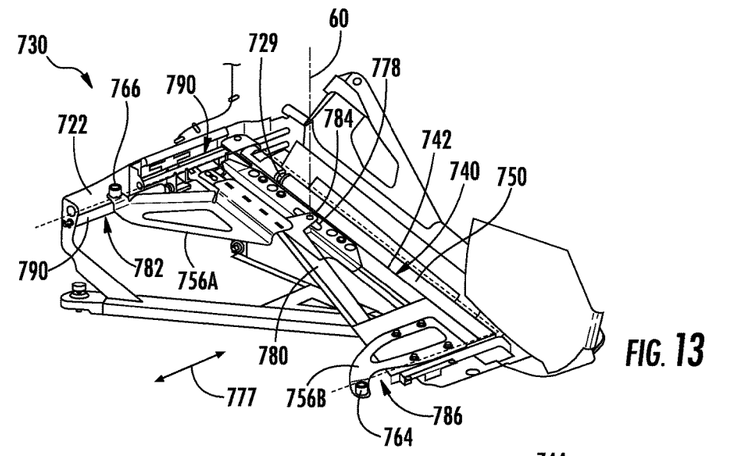
FIG. 13 is a top perspective view of an example belt supporting and correction system of the harvester head of FIG. 12.
Figure 14:
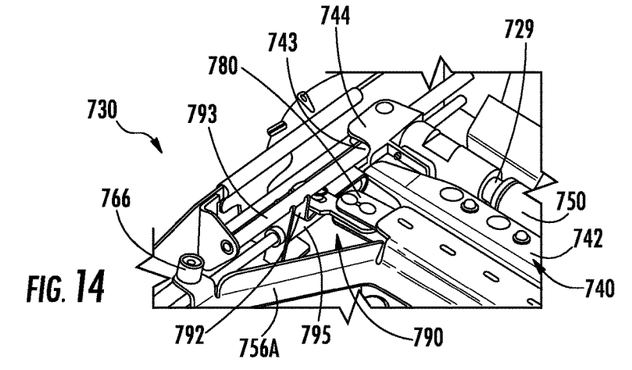
FIG. 14 is an enlarged fragmentary perspective view of a first end portion of the belt supporting and correction system of FIG. 13.
Figure 15:
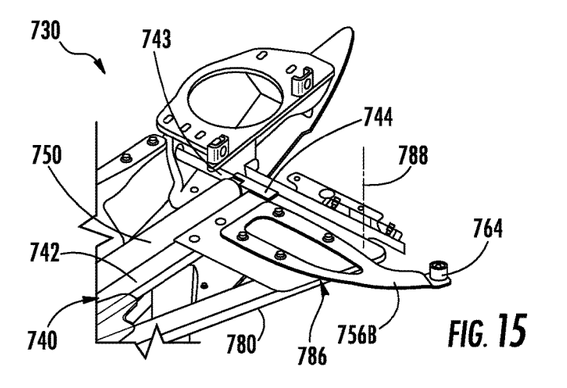
FIG. 15 is an enlarged fragmentary perspective view of a second end portion of the belt supporting and correction system of FIG. 13.

FIGS. 13-15 illustrate one example of belt supporting and correction system 730. System 730 comprises supports draper belt 26 and automatically retracts or realigns a mistracked draper belt 726. Although one end up draper belt 726 illustrated as being supported and guided by system 730, should be appreciated that the other end of belt 726 may likewise be supported and guided by a second system 730, mirroring the system 730 that is shown. System 730 comprises roller support 740, roller 750, tracking correction arms 756A, 756B (collectively referred to as arms 756) and belt tension adjuster 774.

Roller support 740 comprises a support or load bar 742 and a pair of opposite castings 744. Load bar 742 is pivotable about axis 60 relative to frame 722. In one implementation, pivot axis 60 is formed by a pin coupled to one of load bar 742 and frame 722 received within a bushing or bore coupled to the other of load bar 742 and frame 722. In the example illustrated, opposite ends of load bar 742 rest upon an underlying shoulder surface or platform 743 of frame 722 and are provided with sufficient clearance so as to permit pivoting of load bar 742 about pivot axis 60 with load bar 742 sliding along the underlying shoulder surface or platform 743 of frame 722. Castings 744 are supported by load bar 742 and rotationally support roller 750 at opposite ends of roller 750 such that pivoting of load bar 742 also results in pivoting of roller 50 about pivot axis 60.

Roller 750 is coupled to frame 722 so as to be rotatable about a rotational axis 58. Roller 750 rotates about rotational axis 58 as belt 726 is driven about the two spaced supporting rollers, one of which comprises roller 750. Roller 750 is additionally pivotably supported by the frame for pivotal movement about pivot axis 60. Pivot axis 60 extends non-parallel to rotational axis 58. In one implementation, pivot axis 60 extends perpendicular to pivot axis 58. Pivot axis 60 may be formed by a variety of mechanical arrangements or mechanisms.

Each of tracking correction arms 756 is coupled to roller 750 and interacts with draper belt 726 so as to transmit forces resulting from movement of draper belt in directions forwardly or rearwardly along rotational axis 58 so as to pivot roller 50 about pivot axis 60. In the example illustrated, both tracking correction arms 756A and 756B are directly connected to load bar 742, a plate portion of which overlies arm 780, wherein tensioning arm 780 pivot and slides relative to the overlying plate portion of load bar 742.

Tracking correction arms 756 comprise belt bump stops 764, 766 which interact with and contact edges 734 and 736 of draper belt 726, respectively (shown in FIG. 12). In one implementation, stops 764, 766 bare against the edges 734, 736 of the lower span of belt 726. In another implementation, stops 764, 766 bare against the edges 734, 736 of the upper span 7 of 726. In one implementation, stops 764 and 766 concurrently bare against edges 734, 736 of both the lower span and the upper span 7 of 726.

In one implementation, stops 764, 766 are rigid and fixed, sliding along edges 734 and 736 as draper belt 726 is driven. In yet another implementation, stops 764, 766 have outer surfaces that are rotatable, allowing stops 764, 766 to roll along edges 734 and 736 as draper belt 726 is driven. For example, some implementations, stops 764, 766 may have configuration similar to that shown in FIG. 3. As described above respect to tracking correction arms 56, in some implementations, tracking correction arms 756 may interact with draper belt 726 at locations other than edges 734 and 736. For example, tracking correction arms 756 may alternatively interact with other services, such as surfaces 38, surfaces 40 or at least one pair or set of both of surfaces 38 and 40 (illustrated in FIG. 1 and described above) which are on the inside of the loop of belt 726. In some implementations, arms 756 may alternatively interact with surfaces similar to surfaces 38 and 40 that extend on the outside of the continuous loop formed by belt 726.

Tension adjuster 774 adjusts the tension of draper belt 726. Tension adjuster 774 translates load bar 742 and the supported roller 750 in either of the directions indicated by arrows 777. Tension adjuster 774 facilitates such translation and tension adjustment while the same time allowing load bar 742 and roller 750 to pivot about a pivot axis 60 to provide auto correction of a mistracking draper belt 726. Tension adjuster 774 comprises slot 778, tensioning arm 780 and translator 782.

Slot 778 extends into load bar 742. In one implementation, slot 778 extends completely through load bar 742. In another implementation, slot 742 extends partially into load bar 742, having a floor. Slot 778 receives a protuberance or pin 784 projecting from tensioning arm 480. Pin 784 is slidably received within slot 778 and provides pivot axis 60. Pin 784 translates within slot 778 during translation of load bar 742 and roller 750 during tension adjustment of draper belt 726. Although slot 778 is illustrated as being an elongate oval, in other implementation, slot 778 may have other shapes.

Tensioning arm 780 comprises a structure that supports pin 784 within slot 778. Arm 780 has a first end 786 pivotably coupled to frame 722 about a pivot axis 788 and a second end 790 pivotally coupled to translator 782 such that end 790 may be linearly translated by translator 782. Arm 780 has a shape such that translation of end 490 moves pin 784 along an arc with pin 784 sliding within slot 778 as load bar 742 and roller 750 translate in either of the directions indicated by arrows 777 to adjust a tensioning of draper belt 726. In the example illustrated, tensioning arm 780 has a V-shape. In other implementations, arm 780 may have other shapes.

Translator 782 comprise a device to linearly translate end 790 selectively in one of the directions indicated by arrows 777. As illustrated in FIG. 14, translator 782 comprises a threaded shaft 790 extending along an axis parallel to arrows 777 and threadably engaging a corresponding threaded structure 792, which is restricted against rotation by rod 793 (which provides platform 743) and which is coupled to tensioning arm 780 such that rotation of the threaded shaft axially moves tensioning arm 780 such that tensioning arm 780 exerts a force against load bar 242 (through the interaction of pin 784 and slot 778) to translate load bar 742 and its supported roller 750 in one of the directions indicated by arrows 777. In the example illustrated, tensioning arm 780 is further biased by a compression spring 795. In other implementations, tension adjuster 774 may comprise a hydraulic or pneumatic cylinder-piston assembly, an electric solenoid or other linear actuators for translating end 790 of tensioning arm 780 so as to translate load bar 742 and roller 750 for tension adjustment of draper belt 726.

Figure 16:
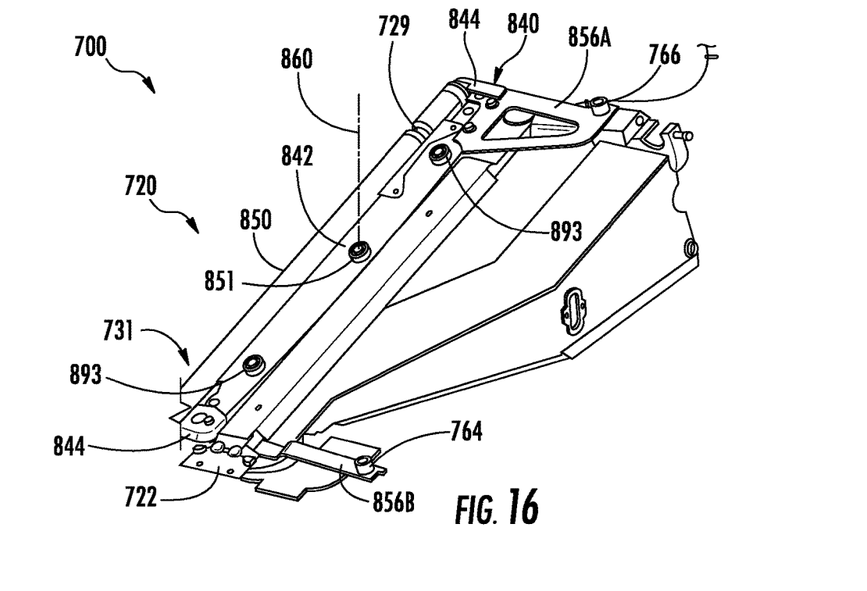
FIG. 16 is a top perspective view of another example belt supporting and correction system of the harvester head of FIG. 12.
Figure 17:
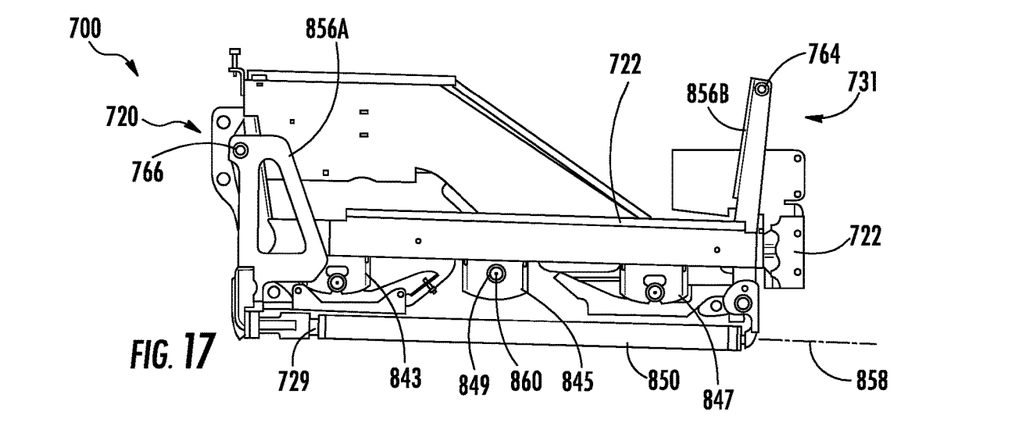
FIG. 17 is a top view of the example belt supporting and correction system of FIG. 16, omitting an example load bar.
Figure 18:
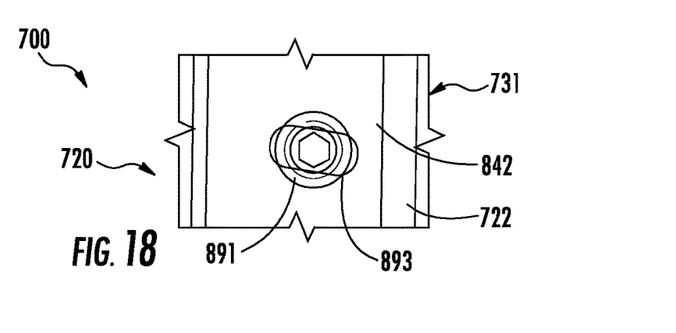
FIG. 18 is an enlarged fragmentary view of a portion of the example belt supporting and correction system of FIG. 16.

FIGS. 16-18 illustrate one example of belt supporting and correction system 731, supporting an opposite end of draper belt 726. As with system 730, system 731 facilitates automatic correction of mistracked draper belt 726. System 731 uses the forces of a mistracking draper belt 726 are used to walk back or return the draper 726 belt to an aligned position or state. As a result, potential damage to the harvester head 720 resulting from a mistracked draper belt is reduced, prolonging the life of the belt 726 and the harvester head 720.

System 731 comprises roller support 840, roller 850 and tracking correction arms 856A, 856B. Roller support 840 comprises a support or load bar 842 and a pair of opposite castings 844. Load bar 842 is pivotable about axis 860 relative to frame 722. In one implementation, pivot axis 860 is formed by a pin coupled to one of load bar 842 and frame 822 received within a bushing or bore coupled to the other of load bar 842 and frame 722. Castings 744 are supported by load bar 742 and rotationally support roller 850 at opposite ends of roller 850 such that pivoting of load bar 842 also results in pivoting of roller 850 about pivot axis 860.

As shown by FIG. 17 which illustrates system 731 without load bar 842, load bar 842 is supported by three underlying blocks 843, 845 and 847 of frame 722. Block 845 comprises an aperture 849 through which a pin 851 extends, providing pivot axis 860. Blocks 843 and 847 extend on opposite sides of block 845 and interact with load bar 842 so as to limit and extent to which load bar 842 pivots about pivot axis 860. As shown by FIG. 18, load bar 842 is pinned to blocks 843 and 847 by a pin 891. Pin 891 extends through an elongate slot 893 of load bar 842. The length of slot 893 limits the extent to which load bar 842 pivots about pivot axis 860. In other implementations, slot 893 and pins 891 may be omitted.

Roller 850 is coupled to frame 722 so as to be rotatable about a rotational axis 858. Roller 750 rotates about rotational axis 58 as belt 726 is driven about the two spaced supporting rollers, roller 750 and 850. Roller 850 is additionally pivotably supported by the frame for pivotal movement about pivot axis 860. Pivot axis 860 extends nonparallel to rotational axis 858. In one implementation, pivot axis 860 extends perpendicular to pivot axis 858. Pivot axis 860 may be formed by a variety of mechanical arrangements or mechanisms.

Each of tracking correction arms 856 is coupled to roller 850 and interacts with draper belt 726 so as to transmit forces resulting from movement up draper belt in directions forwardly or rearwardly along rotational axis 858 so as to pivot roller 850 about pivot axis 860. In the example illustrated, tracking correction arms 856A and 856B are coupled to load bar 842 which is connected to roller 850 by castings 844.

Tracking correction arms 756 comprise belt bump stops 764, 766 which interact with and contact edges 734 and 736 of draper belt 726, respectively (shown in FIG. 12). In one implementation, stops 764, 766 bare against the edges 734, 736 of the lower span of belt 726. In another implementation, stops 764, 766 bare against the edges 734, 736 of the upper span of belt 726. In one implementation, stops 764 and 766 concurrently bare against edges 734, 736 of both the lower span and the upper span of 726.

In one implementation, stops 764, 766 are rigid and fixed, sliding along edges 734 and 736 as draper belt 726 is driven. In yet another implementation, stops 764, 766 have outer surfaces that are rotatable, allowing stops 764, 766 to roll along edges 734 and 736 as draper belt 726 is driven. For example, some implementations, stops 764, 766 may have configuration similar to that shown in FIG. 3. As described above respect to tracking correction arms 56, in some implementations, tracking correction arms 856 may interact with draper belt 726 at locations other than edges 734 and 736. For example, tracking correction arms 856 may alternatively interact with other surfaces, such as surfaces 38, surfaces 40 or at least one pair or set of both of surfaces 38 and 40 (illustrated in FIG. 1 and described above) which are on the inside of the loop of belt 726. In some implementations, arms 856 may alternatively interact with surfaces similar to surfaces 38 and 40 that extend on the outside of the continuous loop formed by belt 726.

Each of belt supporting and correcting system 730 and 731 automatically responds to and addresses mistracking of draper belt 726 in a fashion similar to that described above with respect to systems 30, 230 and 430. System 730 automatically responds to mistracking of draper belt 726 in a fashion similar to that described above with respect to system 430. System 731 automatically responds to and addresses mistracking of draper belt 726 in a fashion to that described above with respect to systems 230 or 330. By automatically self-correcting mistracking of draper belt 726, system 730 and 731 maintain alignment of draper belt 726 to prolong the life of belt 726 and head 720.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A harvester head comprising:
a frame;
a roller having a rotational axis and pivotably supported by the frame about at least one pivot axis nonparallel to the rotational axis, the roller configured to support a draper belt;
at least one tracking correction arm coupled to the roller, the at least one tracking correction arm comprising a first belt bump stop to contact a first portion of the draper belt and a second belt bump stop to contact a second portion of the draper belt such that mistracking of the draper belt relative to the roller pivots the roller about the pivot axis until the draper belt is automatically moved back into a tracking relationship with the roller;
a load bar rotatably supporting the roller about the rotational axis, wherein the load bar is pivotable about the pivot axis, wherein the load bar comprises a slot, wherein the pivot axis is translatable within the slot.

2. The harvester head of claim 1 further comprising a tensioning arm movably supported by the frame and coupled to the roller to translate the roller to adjust the tension of the draper belt, wherein the pivot axis moves within the slot in response to movement of the tensioning arm.

3. The harvester head of claim 2, wherein the tensioning arm carries the least one tracking correction arm.

4. The harvester head of claim 3, wherein the tensioning arm is pivotably fixed relative to the frame at a first end and is pivotable and translatable relative to the frame at a second opposite end.

5. The harvester head of claim 1, wherein the load bar interacts with the frame to limit pivotal movement of the load bar about the pivot axis.

6. The harvester head of claim 1, wherein the first belt bump stop and the second belt bump stop comprise rotatable bushings.

7. The harvester head of claim 1, wherein the first belt bump stop and the second belt bump stop are spaced so as to face opposite edges of the draper belt.

8. The harvester head of claim 1 further comprising a tensioning arm movably supported by the frame and coupled to the roller to translate the roller to adjust the tension of the draper belt.

9. The harvester head of claim 8, wherein the tensioning arm carries the at least one tracking correction arm and is pivotally coupled to the roller about the at least one pivot axis.

10. The harvester head of claim 8, wherein the tensioning arm is pivotably fixed relative to the frame at a first end and is pivotable and translatable relative to the frame at a second opposite end.

11. The harvester head of claim 1 further comprising the draper belt.

12. A method comprising:
wrapping a draper belt about a roller having a rotational axis;
pivoting the roller in a first direction about a pivot axis nonparallel to the rotational axis in response to a mistracking draper belt that is mistracking relative to the roller; and
using force of the mistracking draper belt to pivot the roller in a second direction, opposite the first direction, and automatically move the draper belt back towards tracking with the roller; and
translating the roller in a third direction perpendicular to the rotational axis to adjust the tension of the draper belt.

13. The method of claim 12 further comprising coupling the roller to an edge of the draper belt such that movement of the draper belt during mistracking pivots the roller about the pivot axis.

14. A harvester head comprising:
a draper belt;
a first roller supporting a first end of the draper belt, the first roller having a first rotational axis and pivotably supported by the frame about a first pivot axis nonparallel to the first rotational axis;
at least one first tracking correction arm coupled to the roller, the at least one tracking correction arm comprising a first belt bump stop to contact a first portion of the draper belt and a second belt bump stop to contact a second portion of the draper belt such that mistracking of the draper belt relative to the roller pivots the roller about the pivot axis until the first end of the draper belt is automatically moved back into a tracking relationship with the roller;
a second roller supporting a second end of the draper belt, the second roller having a second rotational axis and pivotably supported by the frame about a second pivot axis nonparallel to the second rotational axis, the second roller being translatable relative to the first roller to adjust a tension of the draper belt;
at least one second tracking correction arm coupled to the second roller, the at least one tracking correction arm comprising a third belt bump stop to contact a third portion of the draper belt and a fourth belt bump stop to contact a fourth portion of the draper belt such that mistracking of the draper belt relative to the second roller pivots the second roller about the second pivot axis until the second end of the draper belt is automatically moved back into a tracking relationship with the second roller.

15. The method of claim 12 further comprising:
rotatably supporting the roller about a rotational axis with a load bar which pivots about the pivot axis; and
translating the pivot axis within a slot of the load bar during translation of the load bar to adjust a tension of the draper belt.

16. The harvester head of claim 14 further comprising a load bar rotatably supporting the first roller about the first rotational axis, the load bar being pivotable about the first pivot axis, wherein the first pivot axis passes through an elongated slot within the load bar and is translatable within the elongated slot during translation of the first roller to adjust a tension of the draper belt.

17. The harvester head of claim 16 further comprising a tensioning arm movably supported by the frame and coupled to the roller to translate the roller to adjust the tension of the draper belt, wherein the pivot axis moves within the slot in response to movement of the tensioning arm.

18. The harvester head of claim 17, wherein the tensioning arm carries the least one tracking correction arm.

19. The harvester head of claim 17, wherein the tensioning arm is pivotally connected to the load bar by a pin extending through the slot in forming the pivot axis, the harvester head further comprising a translator pivotably connected to an end of the tensioning arm, the translator to linearly translate the end of the tensioning arm to pivot the tensioning arm and translate the pin within the slot to translate the load bar to adjust a tension of the draper belt.

* * * * *